United States Patent
Ueda

(10) Patent No.: US 11,277,763 B2
(45) Date of Patent: Mar. 15, 2022

(54) MOBILE TERMINAL MEASUREMENT SYSTEM AND COMMUNICATION MANAGEMENT INFORMATION DISPLAY METHOD

(71) Applicant: ANRITSU CORPORATION, Kanagawa (JP)

(72) Inventor: Makoto Ueda, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 17/153,393

(22) Filed: Jan. 20, 2021

(65) Prior Publication Data

US 2021/0258810 A1   Aug. 19, 2021

(30) Foreign Application Priority Data

Feb. 17, 2020   (JP) .............................. JP2020-024189

(51) Int. Cl.
*H04W 24/06* (2009.01)
*H04W 24/10* (2009.01)
(Continued)

(52) U.S. Cl.
CPC .......... *H04W 24/10* (2013.01); *H04W 24/06* (2013.01); *H04W 36/0022* (2013.01); *H04W 36/14* (2013.01); *H04W 48/16* (2013.01)

(58) Field of Classification Search
CPC . H04W 24/10; H04W 24/06; H04W 36/0022; H04W 36/14; H04W 48/16; H04B 17/23
See application file for complete search history.

(56) References Cited

U.S. PATENT DOCUMENTS

| 7,190,978 B2* | 3/2007 | Saikyo | ................. | H04W 24/00 455/423 |
| 2001/0036201 A1* | 11/2001 | Dieterich | .............. | H04J 3/0632 370/506 |

(Continued)

FOREIGN PATENT DOCUMENTS

JP   2013-009254 A   1/2013

OTHER PUBLICATIONS

"Advanced carrier aggregation and Dual Connectivity technology to achieve higher speed and larger capacity", NTT DOCOMO Technical Journal vol. 23 No 2 pp. 35-45.

*Primary Examiner* — Julio R Perez
(74) *Attorney, Agent, or Firm* — Pearne & Gordon LLP

(57) ABSTRACT

A mobile terminal measurement system 1 tests a mobile terminal 30 corresponding to LTE and NR while controlling an LTE measurement device 10 and an NR measurement device 20 with a control device 50. The control device 50 includes an LTE operation display screen 70 for inputting a test setting value in the LTE measurement device 10, on which a test result corresponding to LTE is displayed, and an NR operation display screen 80 for inputting a test setting value in the NR measurement device 20, on which a test result corresponding to NR is displayed. The control device 50 displays communication management information (UE Capability Information) transmitted from the mobile terminal 30 to the LTE measurement device 10, on the LTE operation display screen 70 and the NR operation display screen 80.

12 Claims, 8 Drawing Sheets

(51) Int. Cl.
*H04W 48/16* (2009.01)
*H04W 36/00* (2009.01)
*H04W 36/14* (2009.01)

(56) References Cited

U.S. PATENT DOCUMENTS

| | | | |
|---|---|---|---|
| 2006/0094416 A1* | 5/2006 | Endo | H04W 24/06 |
| | | | 455/423 |
| 2012/0054324 A1* | 3/2012 | Tada | H04L 12/66 |
| | | | 709/223 |
| 2012/0327782 A1 | 12/2012 | Tanaka et al. | |
| 2016/0149653 A1* | 5/2016 | El Gabbouch | H04B 17/17 |
| | | | 370/250 |
| 2019/0132064 A1* | 5/2019 | Rowell | H04B 17/18 |

* cited by examiner

MOBILE TERMINAL MEASUREMENT SYSTEM AND COMMUNICATION MANAGEMENT INFORMATION DISPLAY METHOD

TECHNICAL FIELD

The present invention relates to a mobile terminal measurement system and a communication management information display method for displaying communication management information of a mobile terminal when measurement of the mobile terminal is performed in an operation mode in which old and new communication standards are mixed.

BACKGROUND ART

For example, in a portable phone system, a radio communication speed with a radio base station (base station below) has been increased with the multi-functionalization of a portable terminal. In recent years, for example, technological development for shifting from 4G (4th generation) services to 5G (5th generation) services by employing an LTE-Advanced method or the like is in progress.

In order to realize a new radio communication system (NR) for 5G, a non-standalone NR operated by a combination of LTE and NR, which is disclosed in Non-Patent Document 1 is being examined.

Regarding the display control of various types of information related to a test of a mobile terminal, Patent Document 1 discloses a technology of performing a display for recognizing setting contents of multiplex communication or a state of the multiplex communication during a test, with including information indicating a dependency relation of the multiplex communication, in a device that tests a communication operation of a mobile communication terminal by simulating a base station that transmits and receives signals based on various communication standards including LTE.

RELATED ART DOCUMENT

Non-Patent Document

[Non-Patent Document 1] Uchino, Teshima, Takeda, NTT DOCOMO Technical Journal Vol. 23 No. 2 pp. 35-45 (July 2015) [Patent Document]
[Patent Document 1] Japanese Patent No. 5290359 (JP-A-2013-9254)

DISCLOSURE OF THE INVENTION

Problem that the Invention is to Solve

The conventional device disclosed in Patent Document 1 displays the operational status of a base station in an LTE area for the measurement of a 4G terminal. The device does not display information for communication management of a base station or a mobile terminal in both areas of NR and LTE in a communication environment of the non-standalone NR.

In a mobile terminal system that tests a 5G terminal (mobile terminal) using a test device (LTE test device) that simulates an LTE base station and a test device (NR test device) that simulates an NR base station in the non-standalone NR communication environment, in order to recognize (manage) the operational status and the like of the mobile terminal, it is desired that a user can display and check, for example, communication management information such as terminal capability information (UE capability information), that is transmitted by the mobile terminal in response to a request from the LTE test device, as necessary. The communication management information (such as terminal capability information) of the mobile terminal includes, generally, one for the LTE side and one for the NR side.

In this type of conventional mobile terminal measurement system, it is common that a master node (LTE test device) receives and manages pieces of communication management information for both the LTE side and the NR side, which are transmitted by the mobile terminal. A configuration of transmitting the communication management information to a secondary node (NR test device) is not made.

Therefore, in this type of conventional mobile terminal measurement system, on the LTE test device side, pieces of communication management information of the mobile terminal, which respectively correspond to the LTE side and the NR side can be displayed using a screen (LTE operation display unit) for displaying the test result corresponding to LTE. However, on the NR test device side, it is not possible to display the communication management information of the mobile terminal, which corresponds to the NR side, on a screen (NR operation display unit) for displaying the test result corresponding to NR.

According to this configuration, for example, in a case where the user checks communication management information of the mobile terminal on the NR side while viewing the test result corresponding to NR on the NR operation display unit, it is necessarily required to perform switching from the NR operation display unit to the LTE operation display unit.

In order to be able to check the pieces of communication management information of the mobile terminal for the LTE side and the NR side without switching of the operation display unit, a configuration in which the LTE test device that acquires pieces of communication management information for both the LTE side and the NR side displays communication management information for the NR side on the LTE operation display unit in addition to communication management information of the mobile terminal for the LTE side is considered. However, the LTE operation display unit has a limited display area. Considering a situation where the number of base stations on the NR side will increase in the future, there is a great concern that the displays will overlap and become difficult to be viewed. In the end, in order to check pieces of communication management information of the mobile terminal for the NR side, an operation to perform switching from the NR operation display unit to the LTE operation display unit is unavoidable.

As described above, in the conventional mobile terminal measurement system that tests mobile terminals in an operation mode in which old and new communication standards such as LTE and NR are mixed, in a case where communication management information of the mobile terminal, which corresponds to the new communication standard, is checked, there are problems that it is necessary to perform switching from the operation display unit for the new communication standard to the operation display unit for the old communication standard, and a work of checking the terminal capability information of the mobile terminal, which corresponds to the new communication standard, is complicated and takes a long time.

The present invention has been made to solve such conventional problems, and an object of the present invention is to provide a mobile terminal measurement system and a communication management information display method, that are capable of checking communication management information of a mobile terminal, which corresponds to a new communication standard, without switching between operation display units for the old and new communication standards, when the mobile terminal is tested in a communication environment in which the old and new communication standards are mixed.

Means for Solving the Problem

In order to solve the above problems, according to a first aspect of the present invention, a mobile terminal measurement system includes a first mobile-terminal measurement device (10) that corresponds to a first communication standard of a mobile communication, a second mobile-terminal measurement device (20) that corresponds to a second communication standard of the mobile communication, and a control device (50) that controls the first mobile-terminal measurement device and the second mobile-terminal measurement device. The tests a mobile terminal (30) corresponding to the first communication standard and the second communication standard. The control device includes a first operation display unit (70) that receives an input of a test setting value of the first mobile-terminal measurement device and displays a test result corresponding to the first communication standard, a second operation display unit (80) that receives an input of a test setting value of the second mobile-terminal measurement device and displays a test result corresponding to the second communication standard, and display control unit (64) for displaying, on the first operation display unit, communication management information of the mobile terminal, which is transmitted from the mobile terminal to the first mobile-terminal measurement device and corresponds to the first communication standard, and displaying, on the second operation display unit, communication management information of the mobile terminal, which is transmitted from the mobile terminal to the first mobile-terminal measurement device and corresponds to the second communication standard.

With this configuration, in the mobile terminal measurement system according to the first aspect of the present invention, when the mobile terminal is tested in a communication environment in which the first communication standard and the second communication standard being the old and new communication standards are mixed, communication management information which is transmitted from the mobile terminal to the first mobile-terminal measurement device and corresponds to each of the old and new communication standards is displayed on both the first operation display unit and the second operation display unit respectively corresponding to the old and new communication standards. Thus, it is possible to easily check the communication management information of the mobile terminal, which corresponds to each of the old and new communication standards, without switching between the old and new operation display units.

According to a second aspect of the present invention, in the mobile terminal measurement system, the display control unit may display terminal capability information (UE Capability Information) of the mobile terminal as the communication management information.

With this configuration, in the mobile terminal measurement system according to the second aspect of the present invention, it is possible to easily check the terminal capability information of the mobile terminal, which corresponds to each of the old and new communication standards, without switching between the old and new operation display units.

According to a third aspect of the present invention, in the mobile terminal measurement system, the display control unit may display measurement report information (Measurement Report) for reporting a current reception operation status of the mobile terminal, as the communication management information.

With this configuration, in the mobile terminal measurement system according to the third aspect of the present invention, it is possible to easily check the measurement report information corresponding to each of the old and new communication standards of the mobile terminal, without switching between the old and new operation display units.

According to a fourth aspect of the present invention, in the mobile terminal measurement system, the display control unit may display terminal capability information (UE Capability Information) of the mobile terminal and measurement report information (Measurement Report) for reporting a current reception operation status of the mobile terminal, as the communication management information.

According to a fifth aspect of the present invention, in the mobile terminal measurement system, the first communication standard may be LTE. The second communication standard may be NR. The mobile terminal (30) may be tested under a non-standalone NR communication environment.

With this configuration, in the mobile terminal measurement system according to the fifth aspect of the present invention, it is possible to check the communication management information of the mobile terminal, which corresponds to each of the communication standards being LTE and NR, without switching between the operation display units for LTE and NR, when the mobile terminal is tested in a non-standalone NR communication environment using LTE and NR.

According to a sixth aspect of the present invention, in the mobile terminal measurement system, the first communication standard may be LTE. The second communication standard may be NR. The mobile terminal (30) may be tested under a non-standalone NR communication environment.

According to a seventh aspect of the present invention, in the mobile terminal measurement system, the first communication standard may be LTE. The second communication standard may be NR. The mobile terminal (30) may be tested under a non-standalone NR communication environment.

According to an eighth aspect of the present invention, in the mobile terminal measurement system, the first communication standard may be LTE. The second communication standard may be NR. The mobile terminal (30) may be tested under a non-standalone NR communication environment.

In order to solve the above problems, according to a ninth aspect of the present invention, there is provided a communication management information display method for displaying communication management information of a mobile terminal (30), which is transmitted from the mobile terminal to a first mobile-terminal measurement device (10) and corresponds to each of a first communication standard and a second communication standard when a control device (50) controls the first mobile-terminal measurement device corresponding to the first communication standard of a mobile communication and a second mobile-terminal measurement device (20) corresponding to the second communication standard of the mobile communication, to test the mobile terminal corresponding to the first communication standard and the second communication standard. The method includes acquiring the communication management information transmitted from the mobile terminal to the first mobile-terminal measurement device (S5), generating first screen information and second screen information based on the acquired communication management information, the first screen information enabling display of the communication management information corresponding to the first communication standard, and the second screen information enabling display of the communication management information corresponding to the second communication standard (S6, S7), and displaying the communication management information corresponding to the first communication standard, on the first operation display unit based on the first screen information, and displaying the communication management information corresponding to the second communication standard, on the second operation display unit based on the second screen information (S8, S16).

With this configuration, the communication management information display method according to the ninth aspect of the present invention is applied when the mobile terminal is tested in a communication environment in which the first communication standard and the second communication standard being the old and new communication standards are mixed, and thus the communication management information which is transmitted from the mobile terminal to the first mobile-terminal measurement device and corresponds to each of the old and new communication standards is displayed on both the first operation display unit and the second operation display unit respectively corresponding to the old and new communication standards. Thus, it is possible to easily check the communication management information of the mobile terminal, which corresponds to each of the old and new communication standards, without switching between the old and new operation display units.

Advantage of the Invention

According to the present invention, it is to provide a mobile terminal measurement system and a communication management information display method, that are capable of checking communication management information of a mobile terminal, which corresponds to a new communication standard, without switching between operation display units for the old and new communication standards, when the mobile terminal is tested in a communication environment in which the old and new communication standards are mixed.

BEST MODE FOR CARRYING OUT THE INVENTION

Hereinafter, a mobile terminal measurement system and a communication management information display method according to an embodiment of the present invention will be described with reference to the drawings.

Figure 1:
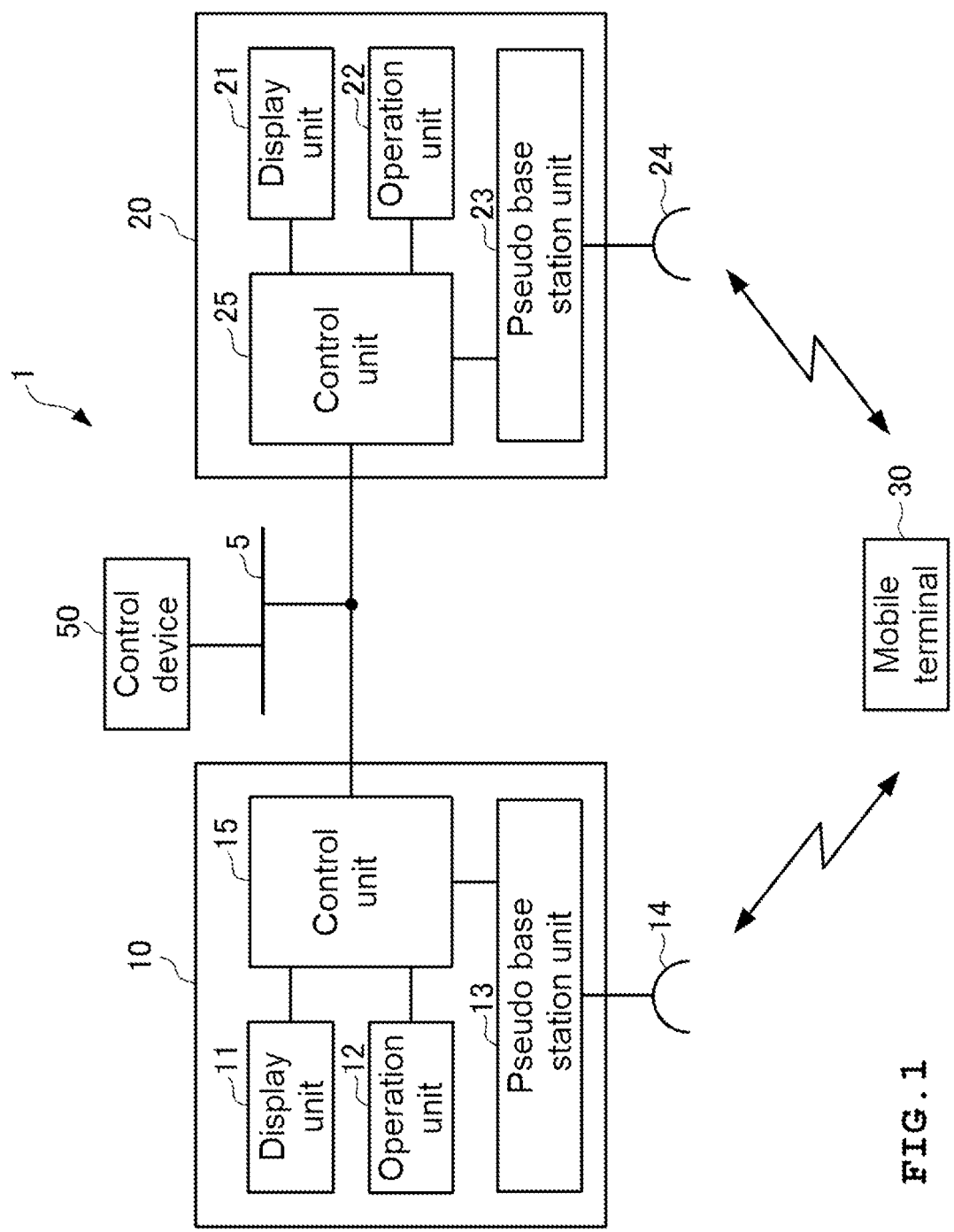
FIG. 1 is a diagram illustrating an overall configuration of a mobile terminal measurement system according to an embodiment of the present invention.

A mobile terminal measurement system 1 according to the embodiment measures a mobile terminal (UE: User Equipment) 30 such as a 5G terminal, that performs communications with LTE and NR communication standards in a non-standalone NR communication environment. As illustrated in FIG. 1, the mobile terminal measurement system includes an LTE measurement device 10, an NR measurement device 20, and a control device 50.

The LTE measurement device 10 is a measurement device that simulates a communication function of a base station in an LTE area of a non-standalone NR network. The NR measurement device 20 is a measurement device that simulates a communication function of a base station in an NR area of the non-standalone NR network. The control device 50 is connected to the LTE measurement device 10 and the NR measurement device 20 by a network 5, and collectively controls the LTE measurement device 10 and the NR measurement device 20 via the network 5. Here, the LTE and NR communication standards correspond to a first communication standard and a second communication standard according to the present invention, respectively.

The LTE measurement device 10 and the NR measurement device 20 wirelessly transmit and receive signals to and from the mobile terminal 30 via antennae 14 and 24.

The LTE measurement device 10 is configured by a computer unit including a central processing unit (CPU), a random access memory (RAM), a read only memory (ROM), a flash memory, a hard disk device, an input port, and an output port.

In the computer unit, a CPU executes an operating system (OS) stored in the hard disk device, and thus the CPU can control devices connected to the input port and the output port.

The LTE measurement device 10 includes a display unit 11, an operation unit 12, a pseudo base station unit 13, the antenna 14, and a control unit 15.

The display unit 11 is configured by an image display device such as a liquid crystal display, and displays an image for inputting necessary information, an image showing a state under test, and the like.

The operation unit 12 is configured by input devices such as a keyboard, a mouse, and a touch panel, and outputs information input by an operation, to the control unit 15.

Under the control of the control unit 15, the pseudo base station unit 13 transmits and receives radio signals to and from the mobile terminal 30 via the antenna 14. The pseudo base station unit 13 controls a communication with the mobile terminal 30 based on a command input from the control unit 15. The pseudo base station unit 13 outputs the state and the like of the communication with the mobile terminal 30, to the control unit 15.

The pseudo base station unit 13 may perform an LTE communication with the mobile terminal 30 in accordance with the LTE standard.

The control unit 15 is configured by a program stored in the hard disk device of the LTE measurement device 10. The control unit 15 operates on the OS of the LTE measurement device 10, controls the display unit 11, the operation unit 12, the pseudo base station unit 13, and the like via the OS, and causes the computer unit to operate as the LTE measurement device 10.

The control unit 15 outputs a command to the pseudo base station unit 13 based on information input to the operation unit 12 to control the operation as the pseudo base station. The control unit 15 displays, on the display unit 11, a guide for an input to the operation unit 12, details of a parameter set in the pseudo base station unit 13, the state of the communication with the mobile terminal 30, which is output from the pseudo base station unit 13, and the like.

The NR measurement device 20 is configured by a computer unit including a CPU, a RAM, a ROM, a flash memory, a hard disk device, an input port, and an output port.

In the computer unit, a CPU executes an operating system (OS) stored in the hard disk device, and thus the CPU can control devices connected to the input port and the output port.

The NR measurement device 20 includes a display unit 21, an operation unit 22, a pseudo base station unit 23, the antenna 24, and a control unit 25.

The display unit 21 is configured by an image display device such as a liquid crystal display, and displays an image for inputting necessary information, an image showing a state under test, and the like.

The operation unit 22 is configured by input devices such as a keyboard, a mouse, and a touch panel, and outputs information input by an operation, to the control unit 25.

Under the control of the control unit 25, the pseudo base station unit 23 transmits and receives radio signals to and from the mobile terminal 30 via the antenna 24. The pseudo base station unit 23 controls a communication with the mobile terminal 30 based on a command input from the control unit 25. The pseudo base station unit 23 outputs the state and the like of the communication with the mobile terminal 30, to the control unit 25.

The pseudo base station unit 23 may perform an NR communication with the mobile terminal 30 in accordance with the NR standard.

The control unit 25 is configured by a program stored in the hard disk device of the NR measurement device 20. The control unit 25 operates on the OS of the NR measurement device 20, controls the display unit 21, the operation unit 22, the pseudo base station unit 23, and the like via the OS, and causes the computer unit to operate as the NR measurement device 20.

The control unit 25 outputs a command to the pseudo base station unit 23 based on information input to the operation unit 22 to control the operation as the pseudo base station. The control unit 25 displays, on the display unit 21, a guide for an input to the operation unit 22, details of a parameter set in the pseudo base station unit 23, the state of the communication with the mobile terminal 30, which is output from the pseudo base station unit 23, and the like.

The control unit 15 of the LTE measurement device 10 and the control unit 25 of the NR measurement device 20 are connected to the control device 50 by the network 5 and can communicate with the control device 50.

Figure 2:
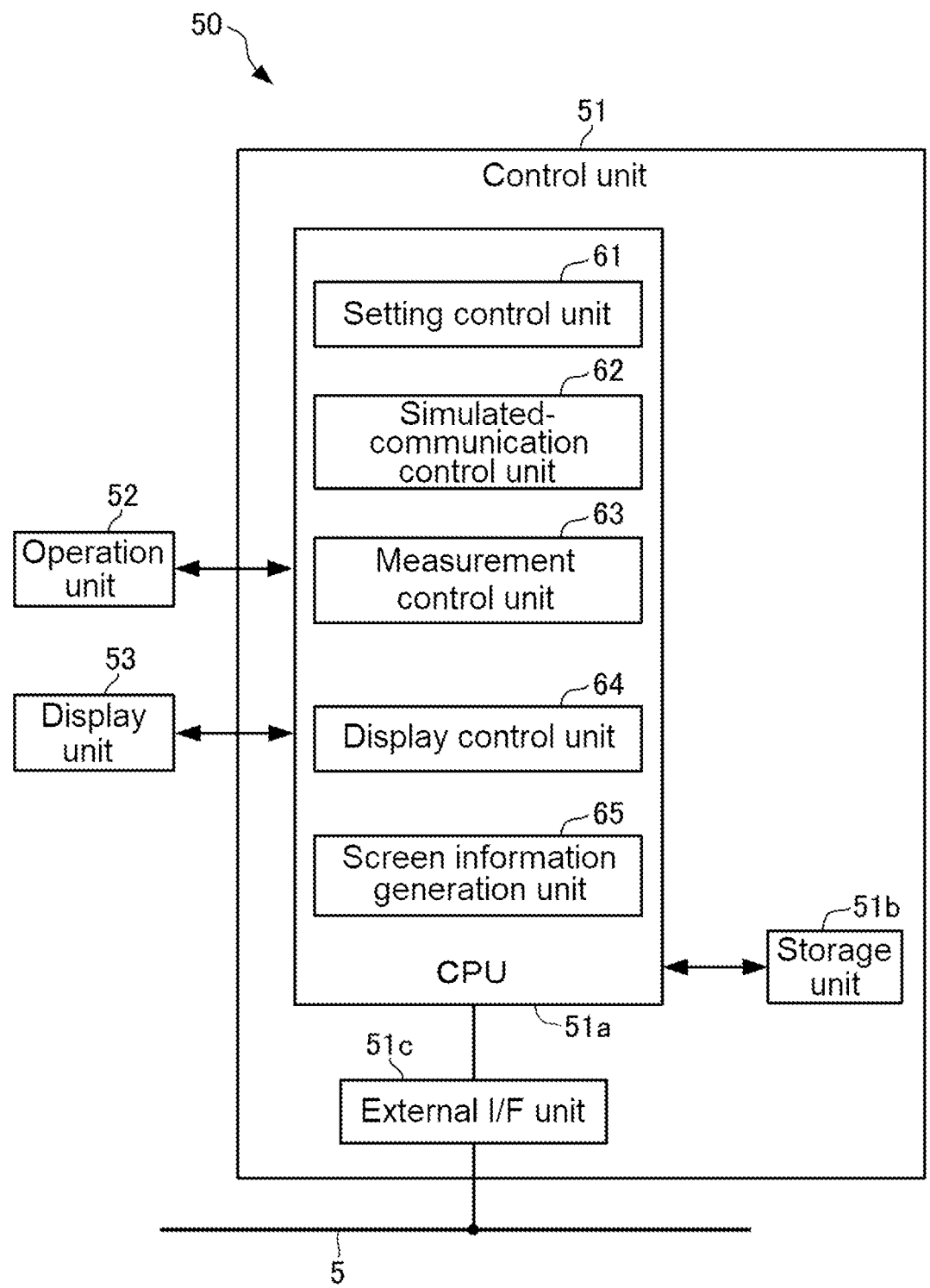
FIG. 2 is a block diagram illustrating a functional configuration of a control device in the mobile terminal measurement system according to the embodiment of the present invention.

The control device 50 functions as a control PC that collectively controls the LTE measurement device 10 and the NR measurement device 20 by a computer device such as a personal computer (PC). The control device 50 includes, for example, a control unit 51, an operation unit 52, and a display unit 53, as illustrated in FIG. 2.

The control unit 51 includes a CPU 51*a*, a storage unit 51*b*, and an external interface (I/F) unit 51*c*. For example, the CPU 51*a* executes a program stored in the storage unit 51*b* to implement a setting control unit 61, a simulated-communication control unit 62, a measurement control unit 63, a display control unit 64, and a screen information generation unit 65. The operation unit 52 has a configuration similar to the configuration of the above-described operation units 12 and 22. The display unit 53 has a configuration similar to the configuration of the above-described display units 11 and 21. The external I/F unit 51*c* serves as an interface function for connecting the control device 50 with the LTE measurement device 10 and the NR measurement device 20 via the network 5.

In the control device 50, the CPU 51*a* includes the setting control unit 61, the simulated-communication control unit 62, the measurement control unit 63, the display control unit 64, and the screen information generation unit 65.

The setting control unit 61 sets a scenario for measurement of the mobile terminal 30 and performs various setting processes of simulation parameters, and the like. The scenario describes a series of operation test procedures for simulating a communication sequence based on a predetermined communication standard (for example, LTE standard and NR standard) that simulates a base station.

The simulated-communication control unit 62 performs a simulated-communication operation in accordance with the above-described scenario. In the simulated-communication operation, a communication between an LTE base station and an NR base station, and the mobile terminal 30 under test is simulated in accordance with the simulation parameter. The combination of the LTE base station and the NR base station for performing a simulated communication is set in advance.

The measurement control unit 63 acquires signals transmitted and received between the LTE base station and the NR base station, and the mobile terminal 30 during the simulated-communication operation, and performs control so that the measurement unit measures whether or not the mobile terminal 30 operates normally.

The display control unit 64 performs control of displaying a setting operation screen and a measurement-relevant information display screen, on the display unit 53. The setting operation screen is used to set the above-described scenario or perform various settings of the simulation parameters before the start of the simulated-communication operation. The measurement-relevant information display screen including a measurement result of the mobile terminal 30 based on signals transmitted and received between the mobile terminal 30, and the LTE base station and the NR base station during the simulated-communication operation. More specifically, the display control unit 64 has a display control function of dividing and displaying an operation display screen into an LTE operation display screen 70 corresponding to LTE and an NR operation display screen 80 corresponding to NR (see FIG. 3 for both). In the operation display screen, the function of the setting operation screen described above and the function of the measurement-relevant information display screen are combined.

That is, on the LTE operation display screen 70, the test setting value (simulation parameter) in the LTE measurement device 10 is input, and the test result corresponding to the LTE communication standard is displayed. On the NR operation display screen 80, the test setting value of the NR measurement device 20 is input, and the test result corresponding to the NR communication standard is displayed. The LTE operation display screen 70 and the NR operation display screen 80 form a first operation display unit and a second operation display unit in the present invention, respectively.

Figure 3:
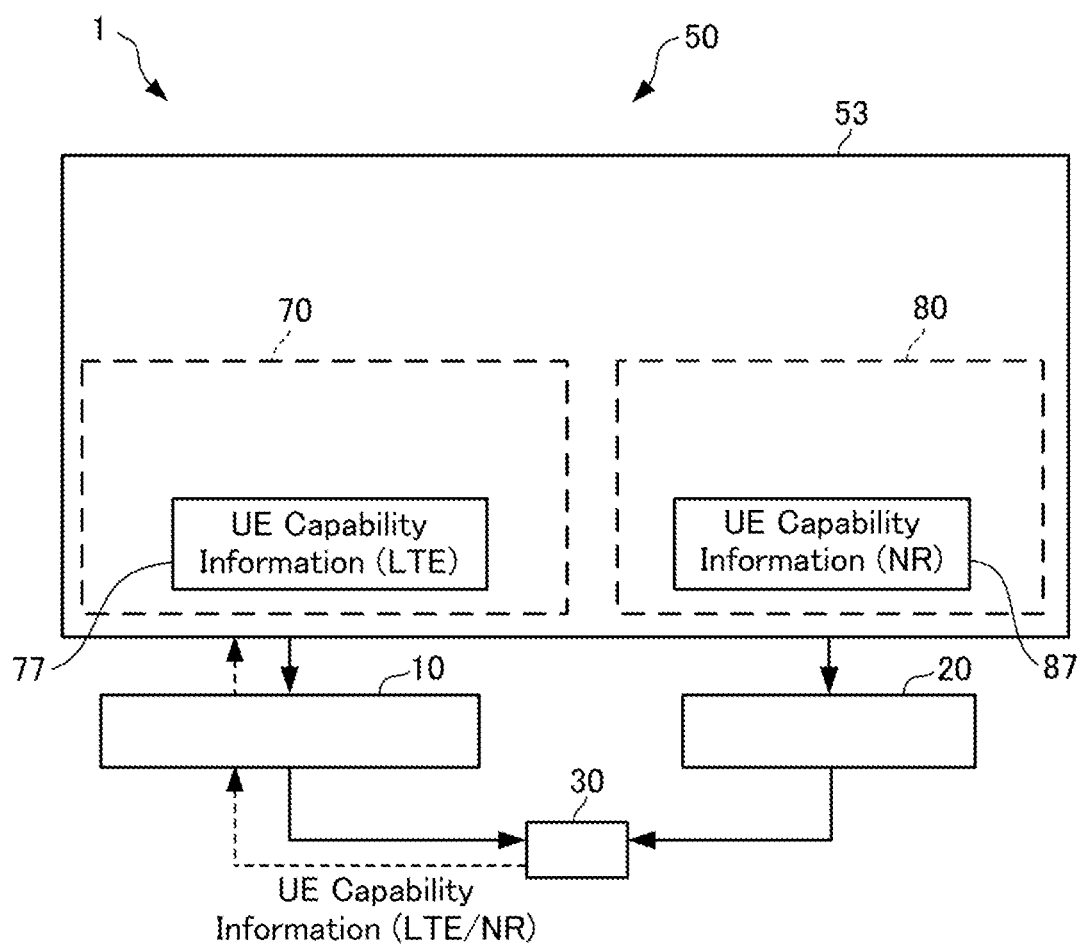
FIG. 3 is a diagram illustrating a display image of terminal capability information on an LTE operation display screen and an NR operation display screen by the control device in the mobile terminal measurement system according to the embodiment of the present invention.

The screen information generation unit 65 is a functional unit that generates the LTE operation display screen 70 and the NR operation display screen 80, which are displayed on the display unit 53 by the display control unit 64. As illustrated in FIG. 3, the LTE operation display screen 70 has a screen configuration capable of displaying, for example, terminal capability information (UE Capability Information (LTE)) of the mobile terminal 30 being the device under test, for LTE. The NR operation display screen 80 has a screen configuration capable of displaying terminal capability information (UE Capability Information (NR)) of the mobile terminal 30 for NR.

The terminal capability information of the mobile terminal 30 for LTE and the terminal capability information for NR (expressed as UE Capability Information (LTE/NR) in FIG. 3) are, for example, information transmitted to the LTE measurement device 10 by the mobile terminal 30 in response to an information acquisition command transmitted to the mobile terminal 30 by the LTE measurement device 10. Such terminal capability information corresponds to communication management information in the present invention. The terminal capability information is information indicating the communication capability of the mobile terminal.

In addition, information (Measurement Report (LTE/NR)) for reporting the current measurement operation status in the mobile terminal 30 is exemplified as the communication management information transmitted to the LTE measurement device 10 by the mobile terminal 30 in response to the information acquisition command from the LTE measurement device 10. As the information (measurement report information) for reporting the measurement operation status, one (Measurement Report (LTE)) corresponding to the LTE side and one (Measurement Report (NR)) corresponding to the NR side are provided.

The LTE operation display screen 70 includes the communication management information which is transmitted to the LTE measurement device 10 by the mobile terminal 30, and is received and stored by only the LTE measurement device 10. The LTE operation display screen has a screen configuration that can be displayed in a predetermined area on the screen in response to a selection operation of a specific tool on the screen.

Similarly, the NR operation display screen 80 also includes the communication management information which is transmitted to the LTE measurement device 10 by the mobile terminal 30, and is received and stored by only the LTE measurement device 10. The NR operation display screen has a screen configuration that can be displayed in a predetermined area on the screen in response to a selection operation of a specific tool on the screen.

According to the control device 50 having a display control function of the LTE operation display screen 70 and the NR operation display screen 80 having the above configurations, the screen information generation unit 65 generates the LTE operation display screen 70 and the NR operation display screen 80. The display control unit 64 controls the LTE operation display screen 70 and the NR operation display screen 80 to be displayed on the display unit 53, and thus it is possible to also display the communication management information (UE Capability Information (NR), Measurement Report (NR)) corresponding to NR, on the NR operation display screen 80 on the NR measurement device 20 side.

Next, a display processing operation of the communication management information in the mobile terminal measurement system 1 according to the embodiment will be described with reference to FIGS. 4 and 5. Here, a case using terminal capability information (UE Capability Information (LTE/NR)) as the communication management information will be described as an example. In the embodiment, the display control in a case using the measurement report information (Measurement Report (LTE/NR)) as the communication management information can be implemented by a display control sequence which is similar to the display control sequence in a case using the terminal capability information (UE Capability Information (LTE/NR)).

Figure 4:
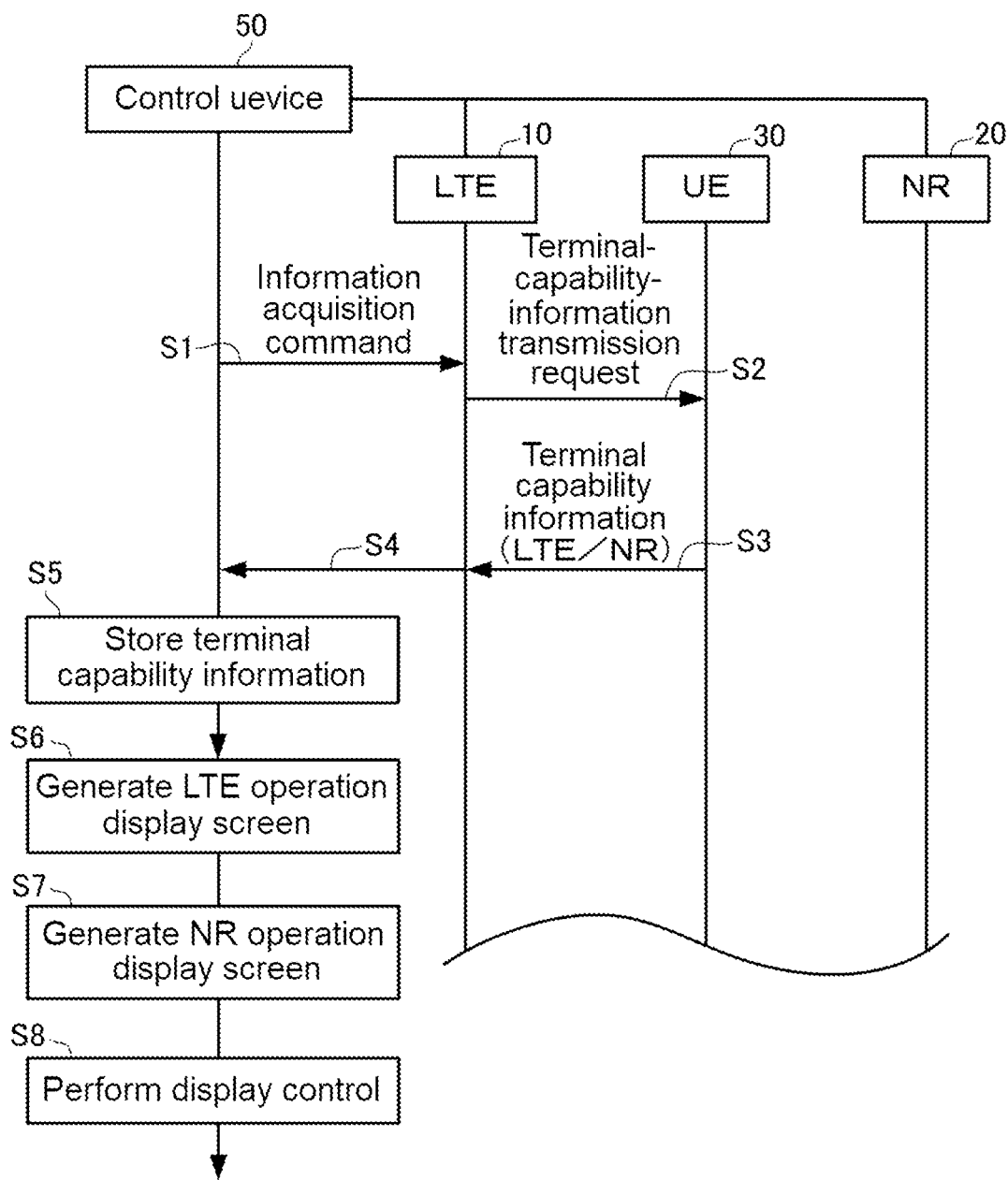
FIG. 4 is a diagram illustrating a display control sequence of the LTE operation display screen and the NR operation display screen by the control device in the mobile terminal measurement system according to the embodiment of the present invention.

FIG. 4 is a diagram illustrating the display control sequence of the communication management information by the control device 50 in the mobile terminal measurement system 1 according to the embodiment. In the display control sequence illustrated in FIG. 4, in the control device 50, firstly, the simulated-communication control unit 62 transmits an information acquisition command to the LTE measurement device (Step S1). The information acquisition command is information for instructing the LTE measurement device 10 to perform an operation of acquiring terminal capability information of the mobile terminal (UE) 30.

After the simulated-communication control unit 62 transmits the information acquisition command, the LTE measurement device 10 that has received the information acquisition command transmits a terminal-capability-information transmission request to the mobile terminal 30 (Step S2). The terminal-capability-information transmission request is information for instructing the mobile terminal 30 to transmit the terminal capability information of the own device (mobile terminal 30).

When the mobile terminal receives the terminal-capability-information transmission request from the LTE measurement device 10, the mobile terminal 30 transmits the terminal capability information of the own device to the LTE measurement device 10 as a transmission source (Step S3). Here, the terminal capability information (LTE/NR) transmitted by the mobile terminal 30 includes the terminal capability information (LTE) corresponding to LTE and the terminal capability information (NR) corresponding to NR.

The LTE measurement device 10 that has received the terminal capability information (LTE/NR) transmitted by the mobile terminal 30 transmits the terminal capability information (LTE/NR) to the control device 50 (Step S4).

In the control device 50, the simulated-communication control unit 62 receives the terminal capability information (LTE/NR) of the mobile terminal 30, which is transmitted from the LTE measurement device 10, and stores the received terminal capability information (LTE/NR), for example, in a predetermined storage area of the storage unit 51*b* (Step S5).

Subsequently, the screen information generation unit 65 executes a process of generating an operation display screen including screen information for displaying the terminal capability information in a predetermined layout, based on the terminal capability information (LTE/NR) stored in the storage area. In the process of generating the operation display screen, the screen information generation unit 65 generates the LTE operation display screen 70 and the NR operation display screen 80 (Steps S6 and S7).

After the process of generating the LTE operation display screen 70 and the NR operation display screen 80 in Steps S6 and S7 is ended, the display control unit 64 in the control device 50 performs display control of displaying the LTE operation display screen 70 or the NR operation display screen 80 in response to a user operation (display request operation) in the operation unit 52 (Step S8).

As described above, the LTE operation display screen 70 and the NR operation display screen 80 generated in Steps S6 and S7 have a screen configuration that may display the terminal capability information (UE Capability Information (LTE)) of the mobile terminal 30 for LTE and the terminal capability information (UE Capability Information (NR)) for NR, respectively.

Thus, in the display control in Step S8, each of the LTE operation display screen 70 and the NR operation display screen 80 is displayed in a form illustrated in FIG. 3, for example. In the example of FIG. 3, the terminal capability information (UE Capability Information (LTE) and UE Capability Information (NR)) corresponding to the LTE and NR communication standards transmitted from the mobile terminal 30 to the LTE measurement device 10 is displayed both the LTE operation display screen 70 and the NR operation display screen 80. According to the display details, the user can check the terminal capability information (UE Capability Information (LTE) and UE Capability Information (NR)) of the mobile terminal 30, which corresponds to the LTE/NR communication standards without switching between the LTE operation display screen 70 and the NR operation display screen 80.

Regarding the display control operation illustrated in FIG. 4, an example in which the communication management information is displayed from the beginning on the main screens of the LTE operation display screen 70 and the NR operation display screen 80 is given. The present invention is not limited to this example. Regarding the LTE operation display screen 70 and the NR operation display screen 80, a mode in which the main screens are firstly displayed, and then the communication management information is called and displayed on the main screens may be obtained.

Next, the display control operation in Step S8 in the display control sequence illustrated in FIG. 4 will be described with reference to the flowchart illustrated in FIG. 5. Here, the LTE operation display screen 70 and the NR operation display screen 80 will be described on the premise that the main screens are firstly displayed, and then communication management information is called and displayed on each of the main screens.

The display control is started by receiving a display request operation on the LTE side screen or the NR side screen by the user. When a display request based on the display request operation is received (Step S11), the display control unit 64 determines whether the display request is for the LTE side screen or the NR side screen (Step S12).

Here, in a case where the display control unit 64 determines that the display request is for the LTE side screen (LTE side in Step S12), the display control unit 64 displays the main screen of the LTE operation display screen 70 on the display unit 53 (Step S13). In a case where the display control unit determines that the display request is for the NR side screen (NR side in Step S12), the display control unit displays the main screen of the NR operation display screen 80 on the display unit 53 (Step S14).

Subsequently, the display control unit 64 monitors the screen operation on the LTE operation display screen 70 (main screen) displayed in Step S13 or the NR operation display screen 80 (main screen) displayed in Step S14, and determines whether or not an instruction to display the communication management information is issued (Step S15). The instruction corresponds to, for example, an operation of selecting a desired item with item selection tools 76 and 86 described later.

Here, in a case where it is determined that the instruction to display the communication management information is issued (YES in Step S15), the display control unit 64 calls the communication management information instructed to be displayed from the storage unit 51*b*. Then, the display control unit displays the communication management information in preset communication management information display area 77 or 87 (see FIGS. 7 and 8) of the LTE operation display screen 70 (main screen) or the NR operation display screen 80 (main screen), which is being displayed (Step S16).

Subsequently, the display control unit 64 determines whether or not an instruction to end the display is issued (Step S17). Here, in a case where the instruction to end the display is not issued (NO in Step S17), the display control unit 64 continues the processes of Steps S15 and S16. During this time, in a case where the instruction to end the display is issued (NO in Step S17), the display control unit 64 ends the series of display control illustrated in FIG. 5.

Next, display forms of the main screen (see FIG. 6) of the LTE operation display screen 70 displayed in each step related to the display control of FIG. 5, the communication management information display area 77 (see FIG. 7) of the LTE operation display screen 70, and the main screen (see FIG. 8) of the NR operation display screen 80 will be described in more detail.

Figure 5:
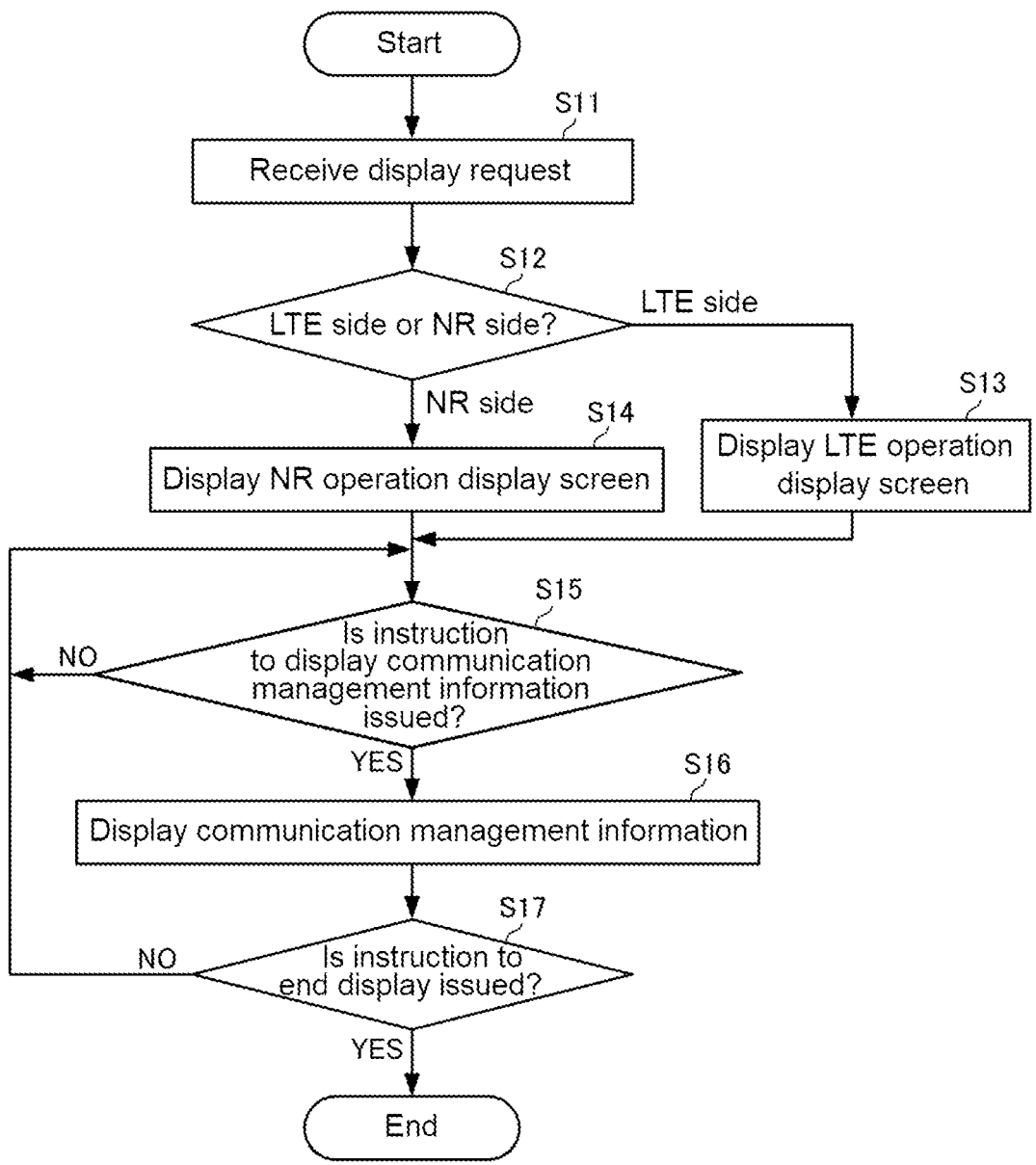
FIG. 5 is a flowchart illustrating a display processing operation in Step S8 in FIG. 4 by the control device in the mobile terminal measurement system according to the embodiment of the present invention.
Figure 6:
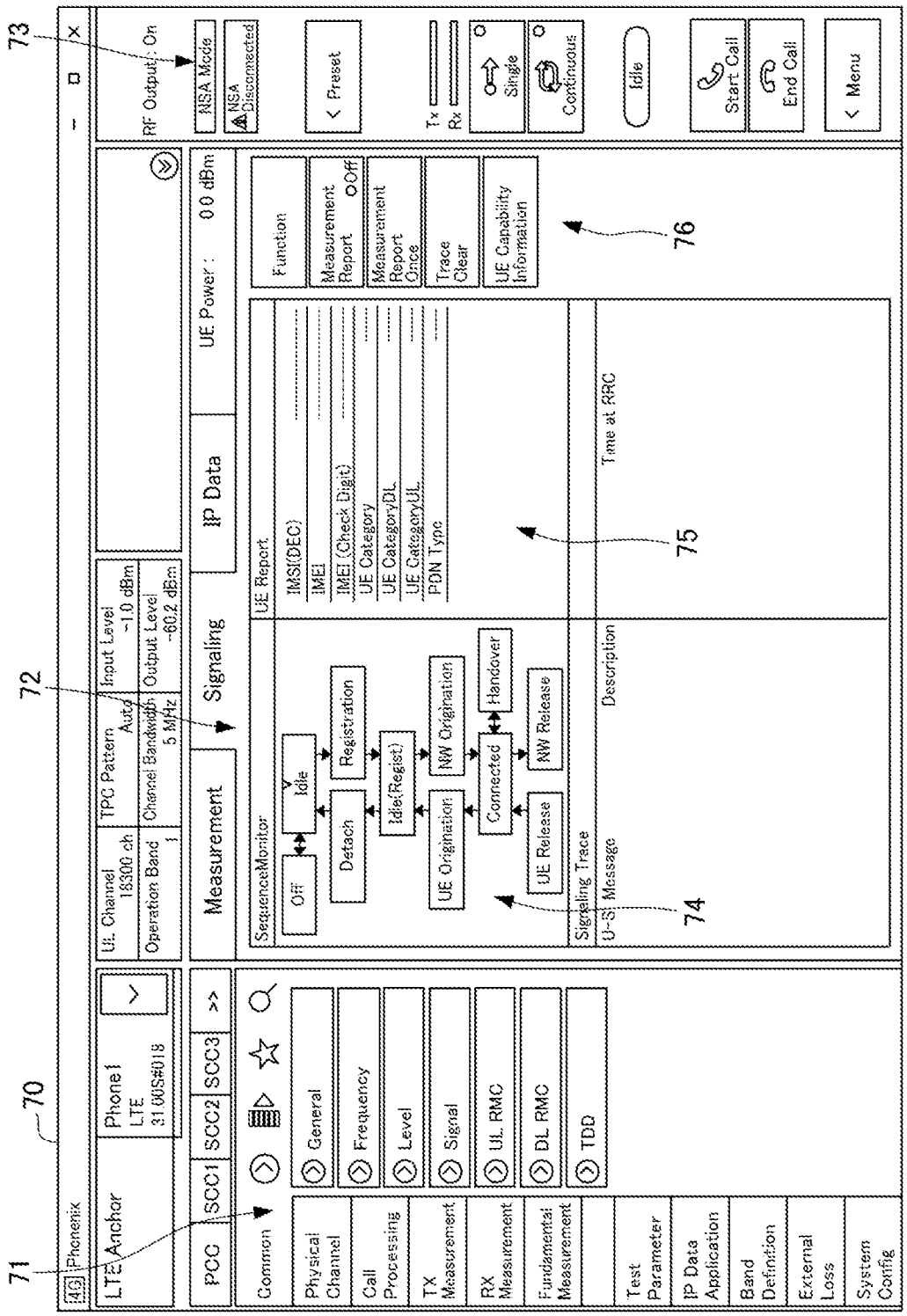
FIG. 6 is a diagram illustrating a display example of the LTE operation display screen by the control device in the mobile terminal measurement system according to the embodiment of the present invention.

The LTE operation display screen 70 (main screen) displayed in Step S13 of FIG. 5 has, for example, the display form illustrated in FIG. 6, and includes a test parameter operation display area 71, a test result operation display area 72, and a test-operation operation display area 73.

The test parameter operation display area 71 refers to a functional portion that enables setting and display of various parameters related to an LTE simulation test. The test result operation display area 72 refers to a functional portion that enables selection and display of test results of the LTE simulation test and items related to the test results. The test-operation operation display area 73 refers to a functional portion that enables various settings (for example, operation to start an operation and operation mode setting) and display related to the operation of the LTE simulation test.

After the LTE operation display screen 70 (main screen) is displayed, the user can operate a desired tool in the test parameter operation display area 71 to set test parameters, and operate a test start button provided in the test-operation operation display area 73. Thus, the measurement (test) of the mobile terminal 30 related to LTE can be performed.

The test result data of the performed test is stored in, for example, the storage unit 51*b*. The display control unit 64 divides and displays the test results of the test in the test result operation display area 72 into items, based on the stored test result data. In the embodiment, items such as "Measurement", "Signaling", and "IP Data" are selectably displayed as the items of the test result.

The user can select a desired item from the items (for example, click the item tab) to display detailed data of the selected item. FIG. 6 illustrates a display example when "Signaling" is selected.

As illustrated in FIG. 6, the test result operation display area 72 when "Signaling" is selected includes a sequence display area 74, a terminal report information display area 75, and the like. The sequence display area 74 is an area for displaying a sequence status of the mobile terminal 30 among "Off (power off)", "Idle (standby state)", "Detach (location registration cancellation)", "Registration (location registration)", "UE Origination (terminal transmission)", "Connected (connection)", "Handover", "UE Release (terminal disconnection)", and "NW (network) Release (connection destination disconnection)". The terminal report information display area 75 is an area for displaying information (UE Report) transmitted (reported) from the mobile terminal 30, for each of items such as IMSI (DEC), IMEI, IMEI (CheckDigit), UECategory, and PDNType.

An item selection tool 76 is further provided in the test result operation display area 72. The item selection tool 76 can selectively designate an item desired to be displayed from items such as "Function", "Measurement Report", and "UE Capability Information".

Figure 7:
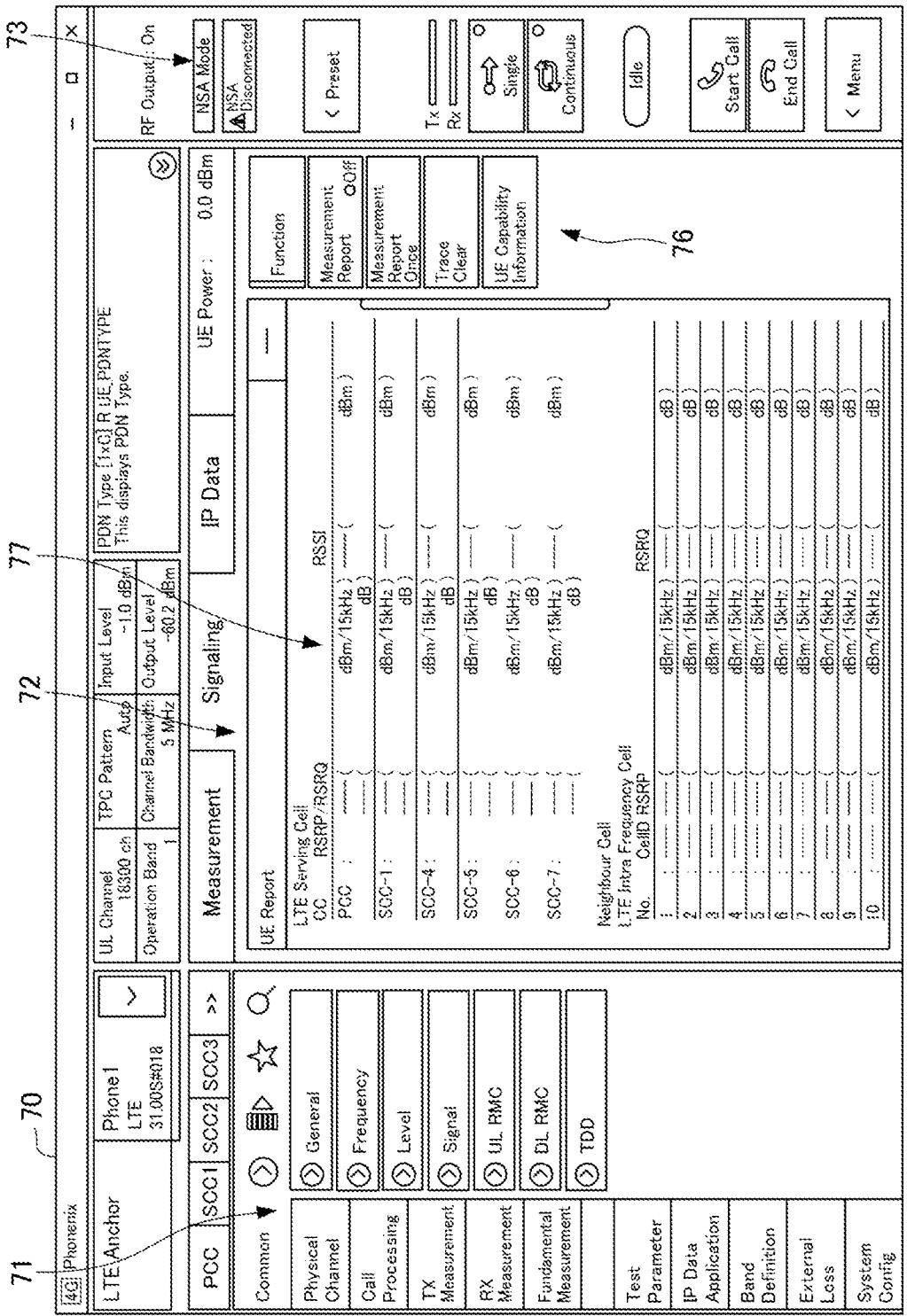
FIG. 7 is a diagram illustrating a display example of the LTE operation display screen transitioning in response to selection designation of "UE Report" in a test result operation display area in FIG. 6.

When the user selects and designates (clicks), for example, "UE Report" in the test result operation display area 75 on the LTE operation display screen 70 (main screen) having the above configuration, the LTE operation display screen 70 transitions to the display form illustrated in FIG. 7, for example. This display control corresponds to the display control in Step S16 of FIG. 5.

As illustrated in FIG. 7, the display form of the LTE operation display screen 70 after the transition has screen contents that the test result operation display area 72 on the main screen (see FIG. 6) of the LTE operation display screen 70 before the transition is changed to the communication management information display area 77.

In FIG. 7, the communication management information display area 77 includes a UE Report area including an LTE Serving Cell area and a Neighbor Cell/LTE Intra Frequency Cell area. The values of items such as SSB-RSRP/RSRQ/SNR and CSIRS-RSRP/RSRQ/SNR of a base station are displayed in the LTE Serving Cell area in association with identification information (for example, SCC-1, SCC-2, or SCC-3) of the base station (LTE Serving Cell) performing transmission in the LTE area. The values of RSRQ and the like of a base station (Neighbour Cell) adjacent to the LTE Serving Cell or the LTE Intra Frequency Cell are displayed in the Neighbor Cell/LTE Intra Frequency Cell area.

On the main screen (see FIG. 6) of the LTE operation display screen 70, the user can select and designate "Measurement Report" by using, for example, the item selection tool 76. When "Measurement Report" is selected and designated, the main screen is displayed with the screen contents, for example, that the test result operation display area 72 is changed to the communication management information display area 77 in which "Measurement Report" information is displayed. At this time, "Measurement Report" displayed in the communication management information display area 77 corresponds to, for example, measurement report information "Measurement Report (LTE)" of the mobile terminal 30 for LTE, which can be acquired in Step S5 in the display control sequence in FIG. 4.

Similarly, on the main screen (see FIG. 6) of the LTE operation display screen 70, the user can select and designate "UE Capability Information" by using, for example, the item selection tool 76. When "UE Capability Information" is selected and designated, the main screen is displayed with the screen contents, for example, that the test result operation display area 72 is changed to the communication management information display area 77 in which "UE Capability Information" information is displayed. At this time, "UE Capability Information" displayed in the communication management information display area 77 corresponds to, for example, "UE Capability Information (LTE)" which can be acquired in Step S5 in the display control sequence in FIG. 4 and is terminal capability information of the mobile terminal 30 for LTE.

Figure 8:
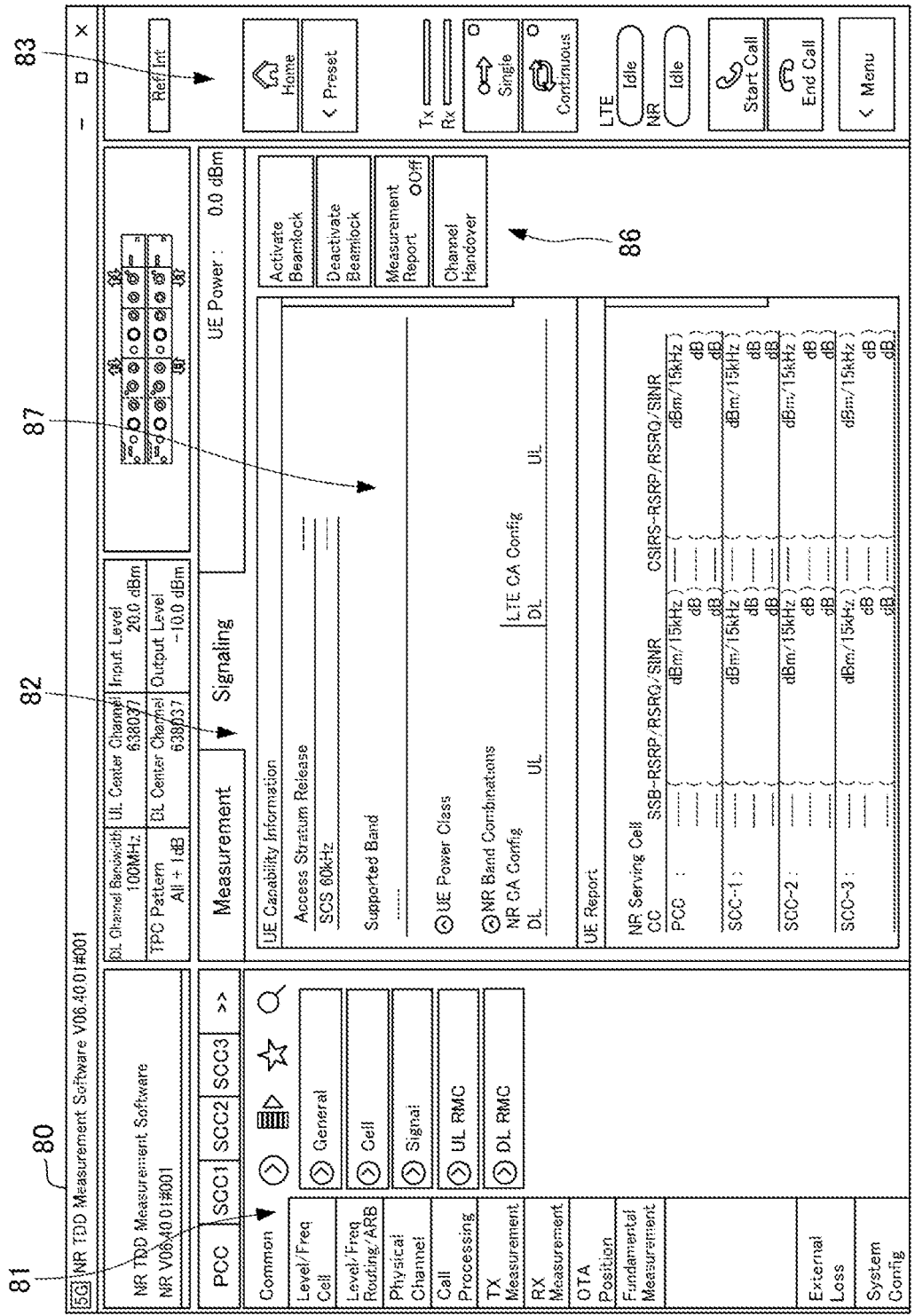
FIG. 8 is a diagram illustrating a display example of the NR operation display screen by the control device in the mobile terminal measurement system according to the embodiment of the present invention.

The NR operation display screen 80 (main screen) displayed in Step S14 of FIG. 5 has, for example, the display form illustrated in FIG. 8, and includes a test parameter operation display area 81, a test result operation display area 82, and a test-operation operation display area 83.

The test parameter operation display area 81, the test result operation display area 82, and the test-operation operation display area 83 on the NR operation display screen (main screen) respectively have functions similar to the functions of the test parameter operation display area 71, the test result operation display area 72, and the test-operation operation display area 73 on the main screen (see FIG. 6) of the LTE operation display screen 70 except that the operation display target corresponds to NR.

On the NR operation display screen 80 (main screen), the test result operation display area 82 includes a UE Capability Information area and a UE Report area. In the UE Capability Information area, information on items such as Access Stratum Release, SCS, Supported Band, UE Power Class, and NR Band Combinations is displayed. The pieces of information correspond to, for example, "UE Capability Information (NR)" which is the terminal capability information of the mobile terminal 30 for NR and can be acquired in Step S5 in the display control sequence of FIG. 4.

An NR Serving Cell area is provided in the UE Report area. The values of items such as SSB-RSRP/RSRQ/SNR and CSIRS-RSRP/RSRQ/SNR of a base station are displayed in the UE Report area in association with identification information (for example, SCC-1, SCC-2, or SCC-3) of the base station (NR Serving Cell) performing transmission in the LTE area.

Although it is not visible at the scroll position of FIG. 8, a Neighbor Cell/NR Intra Frequency Cell area which is equivalent to the Neighbor Cell/LTE Intra Frequency Cell area of the UE Report area in the communication management information display area 77 of the LTE operation display screen 70 illustrated in FIG. 7 is provided at the lower portion of the UE Report area. The values of RSRQ and the like of a base station (Neighbour Cell) adjacent to the NR Serving Cell or the NR Intra Frequency Cell are displayed in the Neighbor Cell/NR Intra Frequency Cell area.

On the NR operation display screen 80 (main screen: see FIG. 8), the user can select and designate "Measurement Report" by using, for example, an item selection tool 86. When "Measurement Report" is selected and designated, the main screen is displayed with the screen contents, for example, that the test result operation display area 82 is changed to a communication management information display area 87 in which "Measurement Report" information is displayed. At this time, "Measurement Report" displayed in the communication management information display area 87 corresponds to, for example, measurement report information "Measurement Report (LTE)" of the mobile terminal 30 for NR, which can be acquired in Step S5 in the display control sequence in FIG. 4.

In the embodiment, for the NR operation display screen (see FIG. 8), a configuration in which the communication management information display area 87 including "UE Capability Information (NR)" and "Measurement Report (NR)" are firstly displayed in the test result operation display area 82 on the main screen is described as an example. A configuration in which a tool (for example, item selection tool 86) enabling selection of the items is provided on the main screen, and the test result operation display area 82 is changed to the display form illustrated in FIG. 8 in response to an operation of the item selection tool 86 may be made.

As described above, in the mobile terminal measurement system 1 according to the embodiment, the communication management information such as "terminal capability information: UE Capability Information (LTE/NR)" and "measurement report information: Measurement Report (LTE)", which is transmitted from the mobile terminal 30 to the LTE measurement device 10, is displayed on the LTE operation display screen 70 and the NR operation display screen 80 for each communication standard.

According to this configuration, for example, when the test result of the mobile terminal 30 for NR is viewed on the NR operation display screen 80, it is possible to check the terminal capability information or the measurement report information for NR on the NR operation display screen 80 as it is, without switching to the LTE operation display screen 70. Also regarding the LTE operation display screen 70, it is possible to check the terminal capability information or the measurement report information for LTE while viewing the test result of the mobile terminal 30 for LTE. Thus, in the embodiment, in order to check the communication management information of the mobile terminal 30 for NR, it is not necessary to perform switching from the NR operation display screen 80 to the LTE operation display screen 70 as in the conventional system. Thus, it is very easy to check the communication management information of the mobile terminal 30 for NR in the non-standalone NR operation mode using the LTE and NR communication standards.

In the embodiment, a configuration example in which the display control unit 64 and the screen information generation unit 65 are provided in the control device 50, and the external control device 50 performs generation and display control of the NR operation display screen 80 for enabling display of the communication management information of the mobile terminal 30 for NR, which is received from the mobile terminal 30 by the LTE measurement device 10 is described as an example. The present invention is not limited to this example. For example, the display control unit 64 and the screen information generation unit 65 may be provided in the NR measurement device 20. The NR measurement device 20 may acquire the communication management information of the mobile terminal 30 for NR, which is received by the LTE measurement device 10, and perform generation and display control of the NR operation display screen 80 for enabling display of the communication management information.

As described above, the mobile terminal measurement system 1 according to the embodiment includes the LTE measurement device 10 corresponding to LTE, the NR measurement device 20 corresponding to NR, and the control device 50 that controls the LTE measurement device 10 and the NR measurement device 20. The system tests the mobile terminal 30 corresponding to the LTE and NR communication standards. In the mobile terminal measurement system 1, the control device 50 includes the LTE operation display screen 70 for inputting the simulation parameters of the LTE measurement device 10 and displaying the test result corresponding to LTE, and the NR operation display screen 80 for inputting the simulation parameters of the NR measurement device 20 and displaying the test result corresponding to NR. The control device includes the display control unit 64 that displays, on the LTE operation display screen 70 and the NR operation display screen 80, the communication management information of the mobile terminal 30, which is transmitted from the mobile terminal 30 to the LTE measurement device 10 and corresponds to each of the LTE and NR communication standards.

With this configuration, in the mobile terminal measurement system 1 according to the embodiment, when the test of the mobile terminal 30 is performed in the communication environment in which LTE and NR being the old and new communication standards are mixed, the communication management information which is transmitted from the mobile terminal 30 to the LTE measurement device 10 and corresponds to each of the old and new communication standards is displayed on both the LTE operation display screen 70 and the NR operation display screen 80. Thus, it is possible to check the communication management information of the mobile terminal 30, which corresponds to each of LTE and NR communication standards, without switching between the LTE operation display screen 70 and the NR operation display screen 80.

In the mobile terminal measurement system 1 according to the embodiment, the display control unit 64 has a configuration of displaying the terminal capability information (UE Capability Information) of the mobile terminal 30, as the communication management information. With this configuration, in the mobile terminal measurement system 1 according to the embodiment, it is possible to easily check the terminal capability information of the mobile terminal 30, which corresponds to each of the old and new communication standards, without switching between the old and new operation display screens 70 and 80.

In the mobile terminal measurement system 1 according to the embodiment, the display control unit 64 has a configuration of displaying the measurement report information (Measurement Report) for reporting the current reception operation status of the mobile terminal 30, as the communication management information. With this configuration, in the mobile terminal measurement system 1 according to the embodiment, it is possible to easily check the measurement report information of the mobile terminal 30, which corresponds to each of the old and new communication standards, without switching between the old and new operation display screens 70 and 80.

The communication management information display method according to the embodiment is a communication management information display method of displaying the communication management information (UE Capability Information and Measurement Report) of the mobile terminal 30, which is transmitted from the mobile terminal 30 to the LTE measurement device 10 and corresponds to each of the LTE and NR communication standards when the control device 50 controls the LTE measurement device 10 corresponding to LTE and the NR measurement device 20 corresponding to NR, and thus the mobile terminal 30 compatible with the LTE and NR communication standards is tested. The method includes the information acquisition step S5 of acquiring the communication management information transmitted from the mobile terminal 30 to the LTE measurement device 10, the screen information generation step S6 and S7 of generating the LTE operation screen information enabling display of the communication management information corresponding to LTE and the NR operation screen information enabling display of the communication management information corresponding to NR, based on the acquired communication management information, and the display control step S8 and S16 of displaying the communication management information corresponding to LTE and NR, on the LTE operation display screen 70 and the NR operation display screen 80 based on the LTE operation screen information and the NR operation screen information.

With this configuration, the communication management information display method according to the embodiment is applied when the test of the mobile terminal 30 is performed in the communication environment in which LTE and NR communication standards being the old and new communication standards are mixed. Thus, the communication management information which is transmitted from the mobile terminal 30 to the LTE measurement device 10 and corresponds to each of the old and new communication standards is displayed on both the LTE operation display screen 70 and the NR operation display screen 80. Thus, it is possible to check the communication management information of the mobile terminal 30, which corresponds to each of LTE and NR communication standards, without switching between the LTE operation display screen 70 and the NR operation display screen 80.

INDUSTRIAL APPLICABILITY

As described above, the mobile terminal measurement system and the communication management information display method according to the present invention exhibit effects that, when the mobile terminal is tested in the communication environment in which the new and old communication standards are mixed, it is possible to check the communication management information of the mobile terminal, which corresponds to the new communication standard without switching between the old and new communication standard operation display units. The mobile terminal measurement system and the communication management information display method are generally useful for the mobile terminal measurement system and the communication management information display method for testing the mobile terminal in the operation mode in which the old and new communication standards such as LTE and NR in which the non-standalone NR communication environment is constructed, are mixed.

DESCRIPTION OF REFERENCE NUMERALS AND SIGNS

1 Mobile terminal measurement system
10 LTE measurement device (first mobile-terminal measurement device)
20 NR measurement device (second mobile-terminal measurement device)
30 Mobile terminal
50 Control device
51 Control unit
64 Display control unit
65 Screen information generation unit
70 LTE operation display screen (first operation display unit)
77 Communication management information display area
80 NR operation display screen (second operation display unit)

What is claimed is:

1. A mobile terminal measurement system comprising:
a first mobile-terminal measurement device that corresponds to a first communication standard of a mobile communication;
a second mobile-terminal measurement device that corresponds to a second communication standard of the mobile communication; and
a control device that controls the first mobile-terminal measurement device and the second mobile-terminal measurement device,
wherein the system tests a mobile terminal corresponding to the first communication standard and the second communication standard, and
the control device includes
a first operation display unit that receives an input of a test setting value of the first mobile-terminal measurement device and displays a test result corresponding to the first communication standard,
a second operation display unit that receives an input of a test setting value of the second mobile-terminal measurement device and displays a test result corresponding to the second communication standard, and
display control unit for displaying, on the first operation display unit, communication management information of the mobile terminal, which is transmitted from the mobile terminal to the first mobile-terminal measurement device and corresponds to the first communication standard, and displaying, on the second operation display unit, communication management information of the mobile terminal, which is transmitted from the mobile terminal to the first mobile-terminal measurement device and corresponds to the second communication standard.

2. The mobile terminal measurement system according to claim 1,
wherein the display control unit displays terminal capability information of the mobile terminal as the communication management information.

3. The mobile terminal measurement system according to claim 1,
wherein the display control unit displays measurement report information for reporting a current reception operation status of the mobile terminal, as the communication management information.

4. The mobile terminal measurement system according to claim 1,
wherein the display control unit displays terminal capability information of the mobile terminal and measurement report information for reporting a current reception operation status of the mobile terminal, as the communication management information.

5. The mobile terminal measurement system according to claim 1,
wherein the first communication standard is LTE,
the second communication standard is NR, and
the mobile terminal is tested under a non-standalone NR communication environment.

6. The mobile terminal measurement system according to claim 2,
wherein the first communication standard is LTE,
the second communication standard is NR, and
the mobile terminal is tested under a non-standalone NR communication environment.

7. The mobile terminal measurement system according to claim 3,
wherein the first communication standard is LTE,
the second communication standard is NR, and
the mobile terminal is tested under a non-standalone NR communication environment.

8. The mobile terminal measurement system according to claim 4,
wherein the first communication standard is LTE,
the second communication standard is NR, and
the mobile terminal is tested under a non-standalone NR communication environment.

9. The mobile terminal measurement system according to claim 2,
wherein the terminal capability information is UE Capability Information of the mobile terminal.

10. The mobile terminal measurement system according to claim 3,
wherein the measurement report information is Measurement Report.

11. The mobile terminal measurement system according to claim 4,
wherein the terminal capability information is UE Capability Information and the measurement report information is Measurement Report.

12. A communication management information display method for displaying communication management information of a mobile terminal, which is transmitted from the mobile terminal to a first mobile-terminal measurement device and corresponds to each of a first communication standard and a second communication standard when a control device controls the first mobile-terminal measurement device corresponding to the first communication standard of a mobile communication and a second mobile-terminal measurement device corresponding to the second communication standard of the mobile communication, to test the mobile terminal corresponding to the first communication standard and the second communication standard, the method comprising:

acquiring the communication management information transmitted from the mobile terminal to the first mobile-terminal measurement device;

generating first screen information and second screen information based on the acquired communication management information, the first screen information enabling display of the communication management information corresponding to the first communication standard, and the second screen information enabling display of the communication management information corresponding to the second communication standard; and displaying the communication management information corresponding to the first communication standard, on the first operation display unit based on the first screen information, and displaying the communication management information corresponding to the second communication standard, on the second operation display unit based on the second screen information.

* * * * *